(12) United States Patent
Takatori

(10) Patent No.: US 9,535,165 B2
(45) Date of Patent: Jan. 3, 2017

(54) RADIATION DETECTION DEVICE

(71) Applicant: Toshiba Electron Tubes & Devices Co., Ltd., Otawara-shi (JP)

(72) Inventor: Koji Takatori, Tochigi-ken (JP)

(73) Assignee: Toshiba Electron Tubes & Devices Co., Ltd., Otawara-shi (JP)

( * ) Notice: Subject to any disclaimer, the term of this patent is extended or adjusted under 35 U.S.C. 154(b) by 0 days.

(21) Appl. No.: 14/032,527

(22) Filed: Sep. 20, 2013

(65) Prior Publication Data

US 2014/0084161 A1 Mar. 27, 2014

(30) Foreign Application Priority Data

Sep. 25, 2012 (JP) ................................. 2012-210842

(51) Int. Cl.
*G01T 1/17* (2006.01)
*G03B 42/04* (2006.01)

(52) U.S. Cl.
CPC .............. *G01T 1/17* (2013.01); *G03B 42/04* (2013.01)

(58) Field of Classification Search
CPC ...................................................... G01T 1/17
USPC .............................. 361/748, 752; 250/370.09
See application file for complete search history.

(56) References Cited

U.S. PATENT DOCUMENTS

| | | | |
|---|---|---|---|
| 6,407,508 B1* | 6/2002 | Kawada | G02F 1/13452 257/668 |
| 6,825,472 B2* | 11/2004 | Endo | 250/370.09 |
| 2002/0014594 A1 | 2/2002 | Endo | |
| 2005/0056789 A1 | 3/2005 | Spahn et al. | |
| 2007/0272873 A1* | 11/2007 | Jadrich | G01T 1/20 250/370.11 |
| 2008/0198545 A1* | 8/2008 | Ni et al. | 361/684 |
| 2009/0202044 A1* | 8/2009 | Wu | G03B 42/02 378/189 |
| 2010/0258730 A1 | 10/2010 | Sumi | |

(Continued)

FOREIGN PATENT DOCUMENTS

| | | |
|---|---|---|
| CN | 101836129 A | 9/2010 |
| JP | 2000-258541 | 9/2000 |

(Continued)

OTHER PUBLICATIONS

Combined Chinese Office Action and Search Report issued Mar. 13, 2015 in Patent Application No. 201310449863.2 (with English Translation of Category of Cited Documents).

*Primary Examiner* — Yara B Green
(74) *Attorney, Agent, or Firm* — Oblon, McClelland, Maier & Neustadt, L.L.P.

(57) ABSTRACT

According to one embodiment, a radiation detection device includes a chassis, a radiation detection panel, a support plate and a circuit board. The chassis includes an incident face cover and a side face portion covering a side face perpendicular to the incident face cover. The radiation detection panel is housed inside the chassis and is configured to detect radiation incident through the incident face cover. The support plate is housed inside the chassis and is fixed to the side face portion to support the radiation detection panel on a rear face on an opposite side to an incident face of the radiation. The circuit board is housed inside the chassis and is disposed on an opposite side to the radiation detection panel of the support plate. At least a part of a drive circuit configured to drive the radiation detection panel is mounted on the circuit board.

14 Claims, 3 Drawing Sheets

(56) References Cited

U.S. PATENT DOCUMENTS

2011/0211673 A1  9/2011  Kawasaki et al.
2013/0077764 A1* 3/2013  Noguchi et al. .............. 378/190

FOREIGN PATENT DOCUMENTS

| JP | 2009-103609 | 5/2009 |
| JP | 2010-145349 | 7/2010 |
| KR | 10-2011-0044903 | 5/2011 |
| WO | WO 2009/054242 A1 | 4/2009 |

* cited by examiner

RADIATION DETECTION DEVICE

CROSS-REFERENCE TO RELATED APPLICATIONS

This application is based upon and claims the benefit of priority from Japanese Patent Application No. 2012-210842, filed on Sep. 25, 2012; the entire contents of which are incorporated herein by reference.

FIELD

Embodiments described herein relate generally to a radiation detection device.

BACKGROUND

Heretofore, as a diagnostic detector detecting radiation, particularly X-ray, an X-ray image detector based on active matrix has received remarkable attention. By exposing the X-ray to a planar detector, an X-ray radiograph or a real-time X-ray image is outputted as a digital signal. Because of a solid detector, expectation is particularly large in image quality and stability as well. For this reason, a lot of universities and manufactures have undertaken research.

In initial practical realization, the detector collecting still image with relatively high radiation has been developed for generally radiographing chest, and recently has been commercialized. By clearing a higher technical hurdle, application is progressed toward commercialization for a field of circulatory organs or digestive organs. In the field, a real-time moving image is necessary to be realized with 30 frames or more per second under fluoroscopic radiation. In the future, important development items are not only a conventional X-ray image detector limiting the installation site as a detection system but also a portable X-ray detector allowing X-ray image diagnosis at any place where the diagnosis is needed and a product allowing auxiliary radiographing of the X-ray image detector in a fixed detection system.

A radiation detection device detecting radiation, particularly X-ray, is used in a wide field such as non-destructive inspection, medical diagnosis and chemical research of structure analysis or the like.

While there are radiation detection devices, a radiation detection device including a radiation detection panel is well known as a high-definition device having high sensitivity, the radiation panel having an optical detector on which a fluorescent material layer converting radiation to light is directly formed. The photodetector includes a photoelectric conversion element unit that a plurality of photosensors and a plurality of TFT (Thin Film Transistor) as switching elements are disposed. The switching element in each pixel is connected to a gate line as a row and a signal line as a column. The gate line and the signal line are disposed in a lattice pattern, and connected to each pixel disposed in the lattice pattern.

By stacking fluorescent material converting X-ray to visible light on a planar photodetector, the incident X-ray from the outside is converted to the visible light inside the fluorescent material and the generated visible light is incident on the planar photodetector. At this time, the incident visible light is converted to a charge in a photodiode inside the planar photodetector. This charge is stored inside the photodiode or inside a capacitance element connected in parallel.

X-ray image information converted to a charge is transmitted outside the substrate through the switching element (TFT) connected to the photodiode. The TFT connected to the gate line having the potential changed becomes the conduction state through the change of the gate line potential. The stored charge in the photodiode connected to the TFT which becomes the conduction state or inside the capacitance element is output to the outside through the TFT. The charge output to the outside is output to the outside of the glass substrate through the signal line connected to the TFT.

The charge signal output to the outside of the glass substrate is input to an integrating amplifier connected to each signal line. The charge information input to the integrating amplifier is converted to a potential signal to be output. The potential signal output from the integrating amplifier is converted to a digital value by an analog/digital converter and finally compiled as an image signal to be output to the outside of the X-ray image detector. The radiation detection panel is supported on one face of a plate-like support plate and a circuit board driving the radiation detection panel is supported on another face of the support panel. These radiation detection panel and the circuit board are electrically connected on a flexible circuit board.

By combining a metal and a resin component so that the support plate supporting the radiation detection panel and the circuit board connected to the radiation detection panel are protected from the outside and become together, a chassis of the radiation detection device is constituted. In particular, in the portable X-ray image detector, a thin type/light weight is achieved, and replacement with a film medium incorporated into the conventional cassette and radiographing the X-ray image is made.

DETAILED DESCRIPTION

Figure 1:
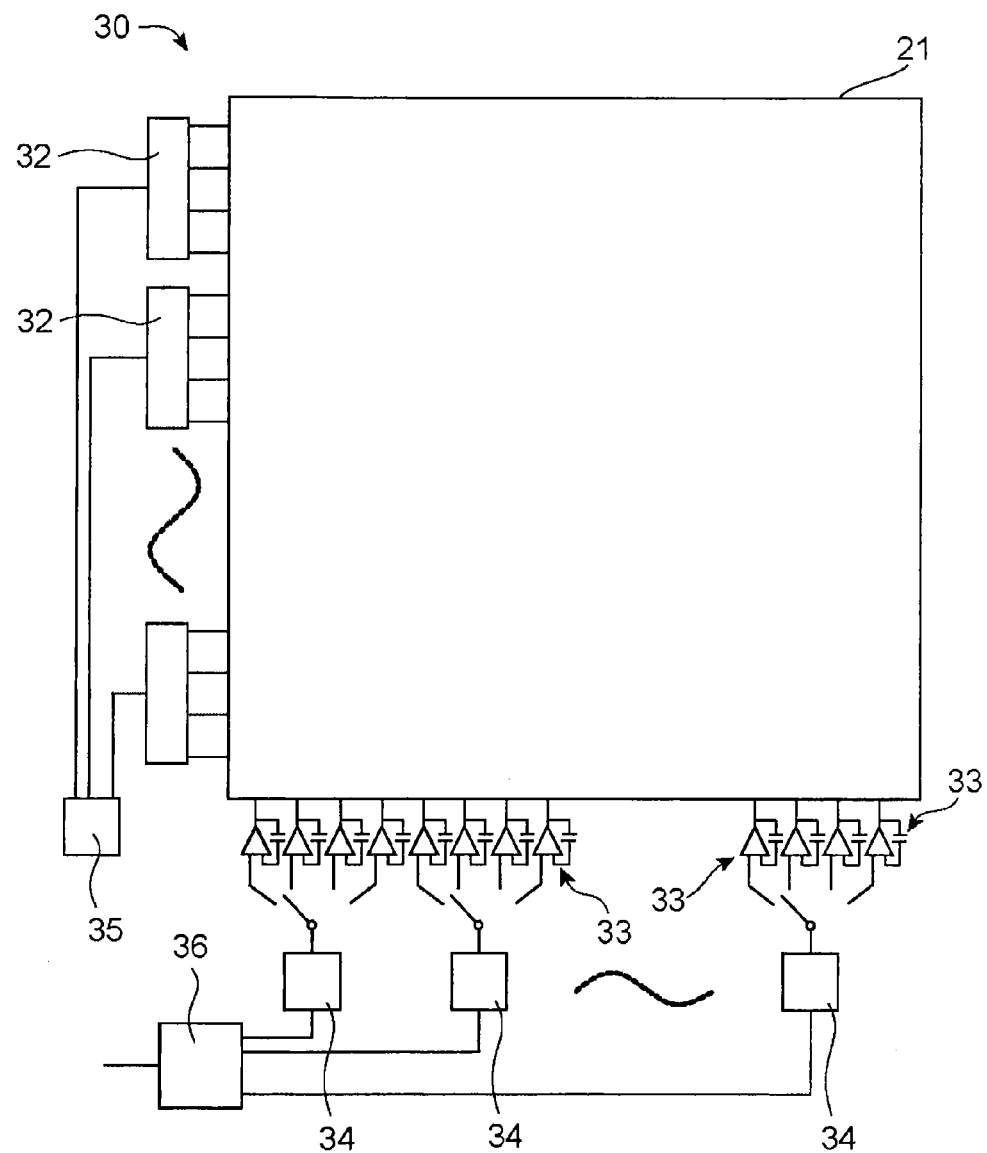
FIG. 1 is a block diagram of a radiation detection device according to a first embodiment.

According to one embodiment, a radiation detection device includes a chassis, a radiation detection panel, a support plate and a circuit board. The chassis includes an incident face cover and a side face portion covering a side face perpendicular to the incident face cover. The chassis is substantially rectangular parallelepiped. The radiation detection panel is housed inside the chassis and is configured to detect radiation incident through the incident face cover. The radiation detection panel is in a plain plate configuration. The support plate is housed inside the chassis and is fixed to the side face portion to support the radiation detection panel on a rear face on an opposite side to an incident face of the radiation. The circuit board is housed inside the chassis and is disposed on an opposite side to the radiation detection panel of the support plate. At least a part of a drive circuit configured to drive the radiation detection panel is mounted on the circuit board.

According to another embodiment, a radiation detection device includes a chassis, a radiation detection panel, a support plate and a circuit board. The chassis includes an incident face cover and a side face cover including a side face perpendicular to the incident face cover. The radiation detection panel is housed inside the chassis and is configured to detect radiation incident through the incident face cover. The radiation detection panel is in a plain plate configuration. The support panel is housed inside the chassis and is fixed to the side face portion to support the radiation detection panel on a rear face on an opposite side to an incident face of the radiation. The circuit board is housed inside the chassis and is disposed on an opposite side to the radiation detection panel of the support plate. At least a part of a drive circuit configured to drive the radiation detection panel is mounted on the circuit board.

A radiation detection device of an embodiment will be described hereinafter with reference to the accompanying drawings. Identical or similar components will be marked with like reference numerals, and overlapping descriptions will be omitted.

Figure 2:
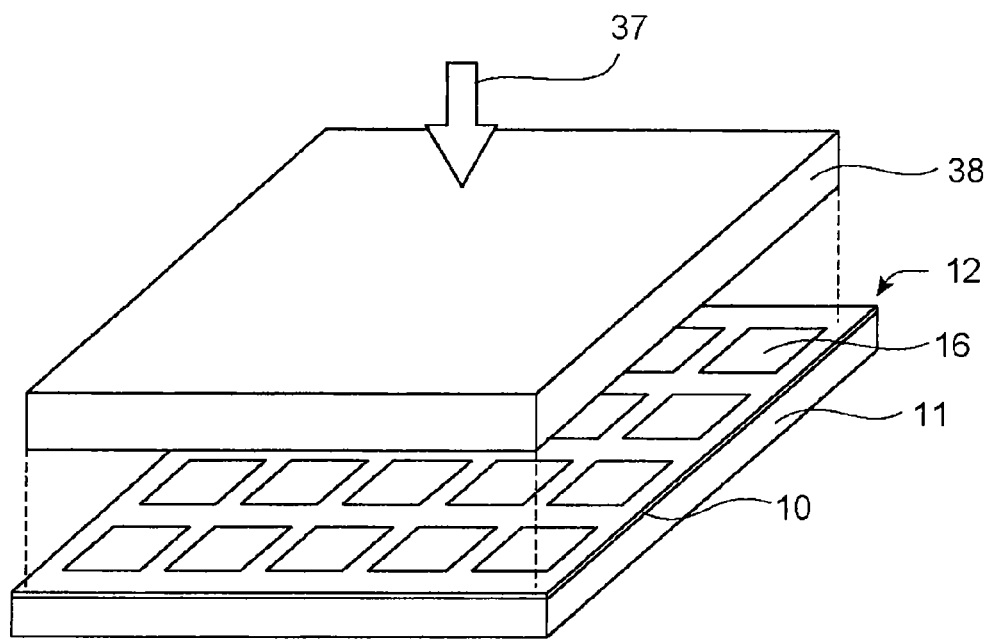
FIG. 2 is a schematic perspective view of a radiation detection panel according to the first embodiment.
Figure 3:
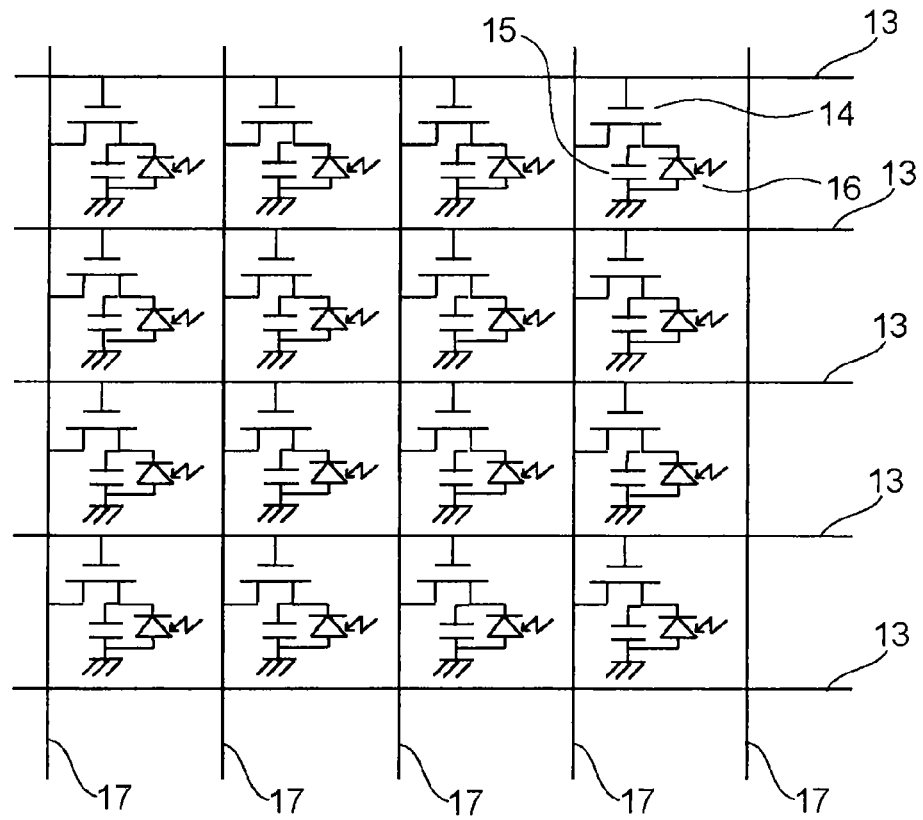
FIG. 3 is a circuit diagram of an image detection unit according to the first embodiment.

FIG. 1 is a block diagram of a radiation detection device according to an embodiment. FIG. 2 is a schematic perspective view of a radiation detection panel according to the embodiment. FIG. 3 is a circuit diagram of an image detection unit according to the embodiment.

A radiation detection device 30 includes a radiation detection panel 21. The radiation detection panel 21 converts incident X-ray to an electrical signal.

A plurality of integrating amplifiers 33 and a plurality of gate drivers 32 are connected to the radiation detection panel 21. A row selection circuit 35 is connected to the gate drivers 32. A/D converters 34 are connected to the integrating amplifiers 33. An image synthesis circuit 36 is connected to the A/D converters 34.

When the gate driver 32 receives a signal from the row selection circuit 35, voltages of a number of gate lines connected to the radiation detection panel 21 are sequentially changed. The integrating amplifiers 33 amplify an extremely minute signal output from the radiation detection panel 21 to output. The gate drivers 32 are connected to the row selection circuit 35 sending a signal to the corresponding gate driver 32 with accordance with a scanning direction of the X-ray image.

The radiation detection panel 21 includes a fluorescence conversion film 38 and an image detection unit 12. Incident X-ray being incident to the fluorescence conversion film 38 is converted to fluorescence inside the fluorescence conversion film 38. The fluorescence generated in the fluorescence conversion film 38 reaches a surface of the image detection unit 12.

The image detection unit 12 has a holding substrate 11 mainly constituted from a glass substrate. A TFT circuit layer 10 and a photodiode 16 are formed in layers on the holding substrate 11. A visible light image incident from the outside is converted to image information of an electrical signal by the image detection unit 12.

Fine pixels are formed in a lattice pattern on the surface of the image detection unit 12. Each pixel includes a thin film transistor 13, a capacitor 15 and the photodiode 16. Each pixel is connected to the gate line 13 and the signal line 17.

Next, the operation of the radiation detection panel will be described.

In an initial state, the detected charge is stored in the capacitance 15, and a voltage in a reverse bias state is applied to the photodiode 16 connected in parallel. The voltage at this time is the same as the voltage applied to the signal line 17.

Since the photodiode 16 is a kind of diodes, a current does not almost flow even if the reverse bias voltage is applied. Therefore, the charge stored in the capacitance 15 is retained without decrease.

In this situation, when the incident X-ray is incident to the fluorescence conversion film 18, high energy X-ray is converted to multiple visible light beams with a low energy inside the fluorescence conversion film 18. A part of fluorescence generated inside the fluorescence conversion film 18 reaches the photodiode 16 disposed on the surface of the image detection unit 12.

The fluorescence incident to the photodiode 16 is converted to a charge formed of an electron and a hole inside the photodiode 16, and the charge arrives at both terminals of the photodiode 16 along a direction of an electric field applied to the capacitance 15, and thereby is observed as a current passing through inside the photodiode 16.

The current generated by the incidence of the fluorescence and passing through inside the photodiode 16 flows into the capacitance 15 connected in parallel and has an operation canceling the charge stored in the capacitance 15. As a result, the charge stored in the capacitance 15 decreases and the potential difference generated between the terminals of the capacitance 15 also decreases in comparison with the initial state.

The gate line 13 is connected to a specific gate driver 32. The gate driver 32 changes sequentially the potential of a number of gate lines 13. In a specific time, only one gate line 13 changes the potential in the gate driver 13. An insulating state is transitioned to a conduction state between a source terminal and a drain terminal of the thin film transistor 14 connected to the gate line 13 having the potential changed.

A specific voltage is applied to each signal line 17. This voltage results in being applied to the capacitance 15 connected through the source terminal and the drain terminal of the thin film transistor 14 connected to the gate line 13 having the potential changed.

Since the capacitance 15 is at the same potential as the signal line 17 in the initial state, when the charge amount of the capacitance 15 does not change from the initial state, charge transfer from the signal line 17 does not occur to the capacitance 15. However, in the capacitance 15 connected in parallel to the photodiode 16 to which the fluorescence generated inside the fluorescence conversion film 38 by the incident X-ray 37 from the outside is incident, the charge stored inside decreases and the potential changes from the initial state. Therefore, the charge transfers from the signal line 17 through the thin film transistor 14 which became the conduction state, and the charge amount stored inside the capacitance 15 goes back to the initial state. The transferred charge amount acts as a signal passing through the signal line 17 and transmits to the outside.

The signal lines 17 are connected to the integrating amplifiers 33. The signal lines 17 are connected to the corresponding integrating amplifiers 33, respectively one-on-one. The current passing through the signal lines 17 is input to the corresponding integrating amplifier 33. The integrating amplifier 33 integrates the current passing through in a predetermined time and outputs the voltage corresponding to the value of integral to the outside.

Performing this operation makes it possible to convert the charge amount passing through the signal line 17 in a certain predetermined time to a voltage value. As a result, a charge signal generated inside the photodiode 16 and corresponding to an intensity distribution of the fluorescence generated inside the fluorescence conversion film 38 by the incident X-ray 37 is converted to potential information by the integrating amplifier 33.

The potential generated by the integrating amplifier 33 is sequentially converted to the digital signal by the A/D converter 34. The signal as digital value is sequentially organized inside the image synthesis circuit 36 according to a row and a column of pixels arranged inside the image detection unit 12 and is output to the outside as an image signal.

By performing these operations continuously, the X-ray image information incident from the outside is converted to image information of the electrical signal and is output to the outside. The image information of the electrical signal output to the outside is possible to be easily imaged by an ordinal display device, and the image makes it possible to observe the X-ray image as an image of visible light.

Figure 4:
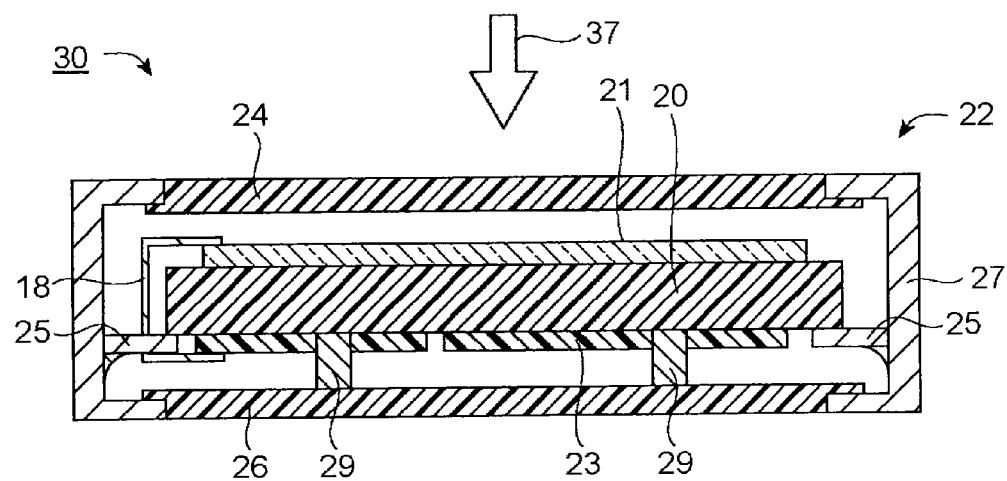
FIG. 4 is a longitudinal sectional view of the radiation detection device according to the first embodiment.
Figure 5:
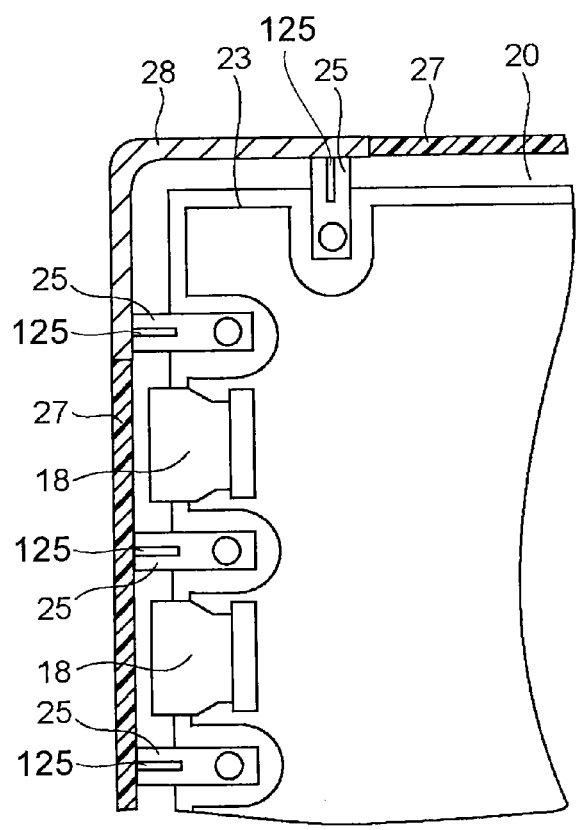
FIG. 5 is a lateral sectional view enlarging a part of the radiation detection device according to the first embodiment.

FIG. 4 is a longitudinal sectional view of the radiation detection device according to the embodiment. FIG. 5 is a lateral sectional view enlarging a part of the radiation detection device according to the embodiment.

The radiation detection device 30 includes the radiation detection panel 21, a support plate 20, a circuit board 23, a flexible circuit board 18 and a chassis 22. The radiation detection panel 21 is housed inside the chassis 22. The chassis 22 includes two planes parallel to the radiation detection panel 21 and is a rectangular parallelepiped box which a distance between the two planes is shorter than a length of a side of the radiation detection panel 21.

The chassis 22 includes an incident face cover 24, a back cover 26, a corner cover 28 and a side cover 27. The incident face 24 is a plain plate opposing the radiation detection panel 21 with separation. The incident X-ray 37 is transparent to the incident face cover 24 and is incident to the radiation detection panel 21. The back cover 26 is a plain plate disposed parallel to the incident face cover 24 on a back side of the radiation detection panel 21, namely on an opposite side to the incident face cover 24.

The corner cover 28 and the side cover 27 form a side face perpendicular to the incident face cover 24 of the chassis 22. The corner cover 28 is disposed at a ridge line portion of each of four corners of the chassis 22. The side cover 27 is disposed at each of four side face portions of the chassis 22.

The incident face cover 24, the back cover 26 and the side cover 27 are fitted with the corner cover 28. The corner cover 28 and the side cover 27 may be molded as a unit. A fixing portion 25 protruding in parallel to the incident face cover 24 and the back cover 26 is provided on the corner cover 28 and the side cover 27.

The side cover 27 and the corner cover 28 are favorable to be molded from a resin material such as ABS, PC and PPS under taking reduction of weight and moldability or the like into consideration. The side cover 27 and the corner cover 28 may be either formed from different materials or formed from the same material. The side cover 27 and the corner cover 28 may be formed as a unit.

The support plate 20 is a plain plate made of, for example, CFRP (carbon fiber reinforced plastic). The support plate 20 is fixed to the fixing portion 25 in parallel to the incident face cover 24. The radiation detection panel 21 and the circuit board 23 are fixed to the support plate 20.

The fixing portion 25 is provided, for example, in a plurality to respective sides of the support plate 20, respectively. The corner cover 28 and the side cover 27 include the fixing portions 25 as a unit structure. By fixing the corner cover 28 and the side cover 27 with the support plate 20 at a plurality of positions via the fixing portions 25, reinforcement of the strength to connect with the support plate 20 is made. The positions and the number of the fixing portions 25 are set so as to fix the side cover 27 and the corner cover 28 to the support plate 20 with a needed strength.

The radiation detection panel 21 and the circuit board 23 are electrically connected by the flexible circuit board 18. The flexible circuit board 18 is, for example, provided in a plurality and disposed so as not to interfere the fixing portion 25. The connection position of the fixing portion 25 and the support plate 20 is favorable to be a position being inward to some extent from the outer edge of the support plate 20 for ensuring connection strength. On the other hand, the circuit board 23 is necessary to be increased depending on the mounted circuit. Then, when the circuit board 23 is increased, it is better to notch the circuit board 23 so as to bypass the connection portion of the fixing portion 25 and the support plate 20.

In order to hold a necessary space between the circuit board 23 and the chassis 22 when the external force is applied to the chassis 22 to deform, a space holding pillar 29 is provided. The space holding pillar 29 is fixed to one of the support plate 20 and the back cover 26, or both of them. Even if the support pillar 29 unites with the circuit board 23 or the back cover 26 of the chassis 22, it is only necessary to ensure the necessary space.

The support plate 20 should have a certain level of stiffness and strength in order to support the panel. The corner cover 28 and the side cover 27 are directly fixed to the support plate 20, and thus the corner cover 28 and the side cover 27 unite with the support plate 27 to result in a high stiffness and strength as the whole. In the structure like this, the strength of the whole chassis 22 depends on a material of the support plate 20, and thus the thin and light weight chassis 22 can be achieved by using a material having a small specific gravity and obtainable a high strength.

A rib 125 perpendicular to the incident face cover 24 is provided on the fixing position between the fixing portion 25 and the corner cover 28 or the side cover 27, namely, an end on the side face side. Thereby, the strength of the fixing portion 25 increases and the strength of the whole chassis 22 increases.

According to the embodiment, the radiation detection panel 21 and the circuit board 23 included in side the chassis 22 can be protected within the restriction of the size of the outer shape against the external force assumed in use of the radiation detection device 30. That is, the tough, light weighted and thin chassis 22 can be achieved.

Particularly, the embodiment is effective in ensuring the strength of the portable radiation detection device 30. In the portable radiation detection device 30, it is necessary to fulfill the size of the outer shape replaceable with the cassette in the diagnosis using the existence film medium. If a support area of the support plate 20 needed from the size of the radiation detection panel 21 is taken into consideration and unnecessary interference with other members is removed, the size allowable for the member of the side face of the chassis 22 is inevitably thin. However, the chassis 22 which can protect the radiation detection panel 21 and the circuit board 23 can be achieved by adopting the fixed structure of the embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A radiation detection device, comprising:
   a chassis including an incident face cover and a plurality of side face portions including a side face perpendicular to the incident face cover, each of the side face portions including a fixing portion protruding inward in parallel to the incident face cover, and the chassis being substantially a rectangular parallelepiped;
   a radiation detection panel housed inside the chassis and configured to detect radiation incident through the incident face cover, the radiation detection panel being in a plain plate configuration;
   a support plate housed inside the chassis and fixed to each fixing portion to support the radiation detection panel, each fixing portion being fixed to the support plate on a rear face of the support plate on an opposite side to an incident face of the radiation;
   a circuit board housed inside the chassis and disposed on an opposite side to the radiation detection panel of the support plate, at least a part of a drive circuit configured to drive the radiation detection panel being mounted on the circuit board; and
   a plurality of flexible circuit boards electrically connecting the radiation detection panel and the circuit board, wherein
   the fixing portions are provided in a plurality of positions without interference with the flexible circuit boards, a planar shape of the support plate is a quadrangle, the fixing portions are provided in a vicinity of each side of the support plate, the fixing portions are provided at a position away from a corner of the support plate, and one of the plurality of the flexible circuit boards is provided in between a pair of the fixing portions.

2. The device according to claim 1, wherein
   the chassis further includes a back cover and a plurality of corner covers,
   the back cover is disposed in parallel to the incident face cover on an opposite side to the incident face cover,
   one of the side covers is provided on each of the side face portions, and
   each of the corner covers is provided at a corner of the chassis.

3. The device according to claim 2, wherein
   the side covers and the corner covers are configured to be assembled as a unit.

4. The device according to claim 1, wherein
   a rib perpendicular to the incident face cover is provided on an end on a side face side of each fixing portion.

5. The device according to claim 1, further comprising:
   a space holding pillar provided between the chassis and the circuit board.

6. The device according to claim 1, wherein
   the circuit board includes a notch bypassing a connection portion of one of the fixing portions and the support plate.

7. The device of claim 1, wherein each fixing portion is fixed to the support plate only on a rear face of the support plate on the opposite side to the incident face of the radiation.

8. The device of claim 1, wherein all of the fixing portions are fixed to the support plate on a rear face of the support plate.

9. A radiation detection device, comprising:
   a chassis including an incident face cover, a plurality of side covers, and a plurality of corner covers, each of the side covers and the corner covers including a side face perpendicular to the incident face cover, each of the side covers and each of the corner covers including a fixing portion protruding inward in parallel to the incident face cover;
   a radiation detection panel housed inside the chassis and configured to detect radiation incident through the incident face cover, the radiation detection panel being in a plain plate configuration;
   a support plate housed inside the chassis and fixed to each fixing portion to support the radiation detection panel, each fixing portion being fixed to the support plate on a rear face of the support plate on an opposite side to an incident face of the radiation;
   a circuit board housed inside the chassis and disposed on an opposite side to the radiation detection panel of the support plate, at least a part of a drive circuit configured to drive the radiation detection panel being mounted on the circuit board; and
   a plurality of flexible circuit boards electrically connecting the radiation detection panel and the circuit board, wherein
   the fixing portions are provided in a plurality of positions without interference with the flexible circuit boards, a planar shape of the support plate is a quadrangle, the fixing portions are provided in a vicinity of each side of the support plate, the fixing portions are provided at a position away from a corner of the support plate, and one of the plurality of the flexible circuit boards is provided in between a pair of the fixing portions.

10. The device according to claim 9, wherein
    the chassis further includes a back cover,
    the back cover is disposed in parallel to the incident face cover on an opposite side to the incident face cover, and
    each of the corner covers is provided at a corner of the chassis.

11. The device according to claim 9, wherein
    a rib perpendicular to the incident face cover is provided on a fixing position between one of the fixing portions and one of the side covers.

12. The device according to claim 9, further comprising:
    a space holding pillar provided between the chassis and the circuit board.

13. The device according to claim 9, wherein
    the side covers and the corner covers are configured to be assembled as a unit.

14. The device according to claim 9, wherein
    the circuit board includes a notch bypassing the connection portion of one of the fixing portions and the support plate.

* * * * *